March 12, 1968 J. H. HUMPHREY ET AL 3,372,787

TAPE EMBOSSING APPARATUS WITH TAPE VISIBLE PROXIMATE THE EMBOSSING MEANS

Filed Dec. 22, 1966 3 Sheets-Sheet 1

INVENTORS.
JOHN H. HUMPHREY
HARRY F. SCHEIRER
LEONARD W. CHESLAK
By White & Haefliger
ATTORNEYS.

INVENTORS.
JOHN H. HUMPHREY
HARRY F. SCHEIRER
LEONARD W. CHESLAK
By White & Haefliger
ATTORNEYS.

INVENTORS.
JOHN H. HUMPHREY
HARRY F. SCHEIRER
LEONARD W. CHESLAK
BY White & Haefliger
ATTORNEYS.

United States Patent Office 3,372,787
Patented Mar. 12, 1968

3,372,787

TAPE EMBOSSING APPARATUS WITH TAPE VISIBLE PROXIMATE THE EMBOSSING MEANS

John H. Humphrey, Los Angeles, and Harry F. Scheirer and Leonard W. Cheslak, Garden Grove, Calif., assignors to Apsco Products, Los Angeles, Calif., a corporation of Illinois Filed Dec. 22, 1966, Ser. No. 603,859
15 Claims. (Cl. 197—6.7)

ABSTRACT OF THE DISCLOSURE

This invention concerns a hand operated tape embossing apparatus incorporating several improvements. The latter include the provision of: a finger or thumb adjustable roller to controllably advance and retract the tape along a feed channel; a pivoted actuator forming a tape supply roll magazine; and simplifications in tape feeding, guiding and embossing structure.

This invention relates generally to hand operated tape embossing apparatus, and more particularly concerns improvements in such tools having to do with simplification of construction and mode of operation thereof.

The present tape embossing apparatus solves certain problems associated with prior tools of this class. Included among such problems and disadvantages are lack of sufficiently simple and rapid adjustability of the tape feed, in both advancement and retraction modes; the manipulative disadvantages and expense of tape supply magazines that require separate attachment to the hand tool; undesirably complex construction of prior tools; and absence of the combinations and sub-combinations of features of construction, mode of operation and unusual results afforded by the present apparatus.

Basically, the improved hand operable tape embossing apparatus comprises body structure defining an elongated tape feed channel, rotor structure including die means carried by the body structure in such relation to the channel as to be rotatable relative thereto for bringing selected die means into tape embossing position, an actuator carried by the body for movement relative thereto in response to variable hand gripping of the apparatus, and means operable in response to actuator movement for causing selected die means to engage and emboss the tape and for effecting advancement of the tape along the channel, the latter means including a roller presented for independent adjustment rotation by the user's thumb or finger to controllably advance and retract the tape along the channel. As will appear, the actuator is typically pivoted to form a hollow magazine in the handle portion thereof for receiving a roll of tape to feed along the channel, thereby obviating need for a separate tape magazine. Typical of the tape adapted for embossment is that described in U.S. Patent 3,096,945 to Souza. Such tape includes a plastic sheet adapted to crease whiten when embossed, and a backer sheet adhesively bonded thereto.

Additional important features of the invention contributing to the advantages mentioned above are the provision of non-rotary plates spaced apart in the direction of an axis defined by rotation of the rotor structure and between which the rotor structure is confined, one of the plates and the rotor structure carrying selectively registrable indicia indicative of the tape embossing position of selected die means; the provision of a tape guide carried to project from between die element carrying rotors of the rotor structure and toward the tape feed channel to protectively space the tape from spring fingers on a lower rotor and also to guide tape advancement into embossing position between the rotors; the provision of a plunger carried by the actuator and projecting upwardly toward the channel for movement to cause selected die means to engage and emboss the tape, and a spring having the dual functions of urging the plunger in a direction away from the channel and of urging the actuator away from the body structure; and the provision of the unusually advantageous second roller and escapement drive therefor as will be described.

These and other objects and advantages of the invention, as well as the details of illustrative embodiments, will be more fully understood from the following detailed description of the drawings, in which.

Figures 1, 2, 3:
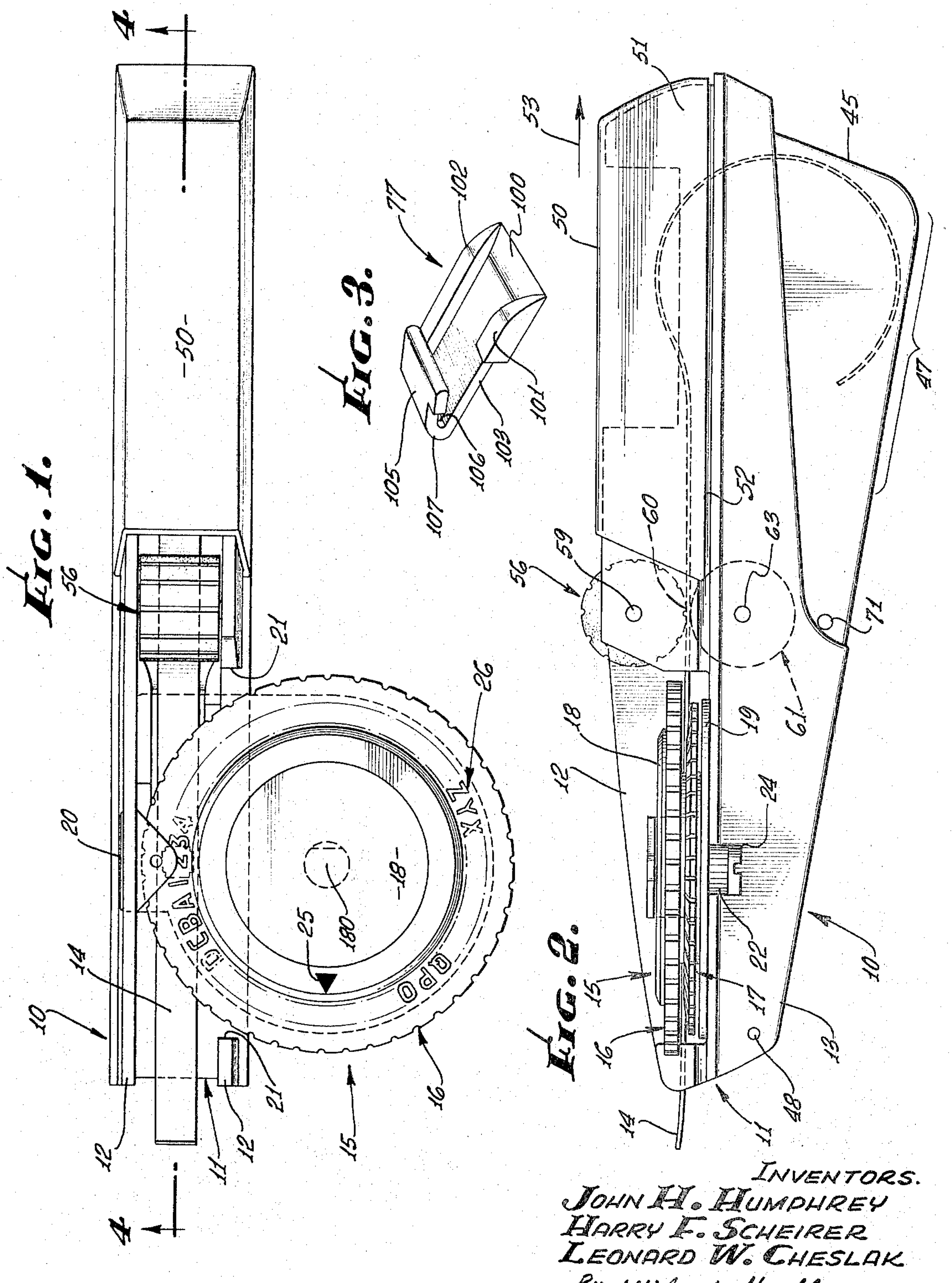
FIG. 1 is a plan view of one preferred embodiment of the tool.
FIG. 2 is side elevation of the FIG. 1 tool.
FIG. 3 is a perspective view showing a rearward guide for tape.
Figures 4, 5, 6:
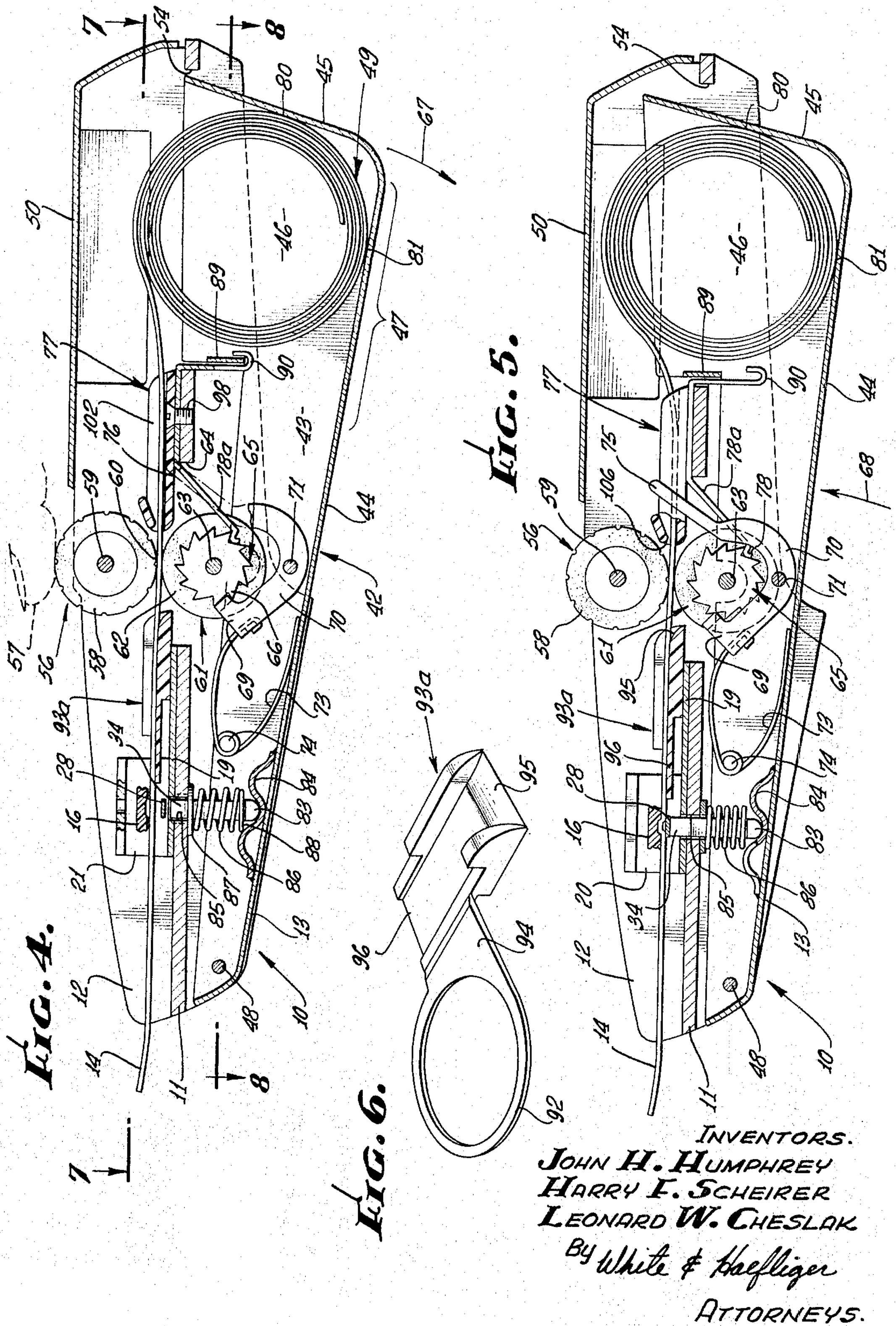
FIG. 4 is a section taken on line 4—4 of FIG. 1 showing the actuator handle in released position.
FIG. 5 is a view like FIG. 4, but showing the actuator handle in gripped or upwardly displaced position.
FIG. 6 is a perspective view of a forward guide for tape.

Referring first to FIGS. 1, 2 and 4, body structure is generally indicated at 10 as defining an elongated tape feed channel, as for example is formed by the channel defined by the horizontal table 11 and the vertically projecting channel flanges 12, together defining a channel frame. The flanges 12 have lower extensions 13 projecting below the level of the base or table 11. In this regard, the tape is shown at 14 extending generally horizontally within the tape feed channel defined between the flanges 12.

As will be seen, rotor structure including die means is carried by the body structure in such relation to the channel as to be rotatable relative thereto for bringing selected die means into tape embossing position. Extending the description to FIG. 9, the rotor structure is generally indicated at 15 and includes an upper rotor 16 and a lower rotor 17 defining an axis of rotation 180.

Figures 7, 9, 13:
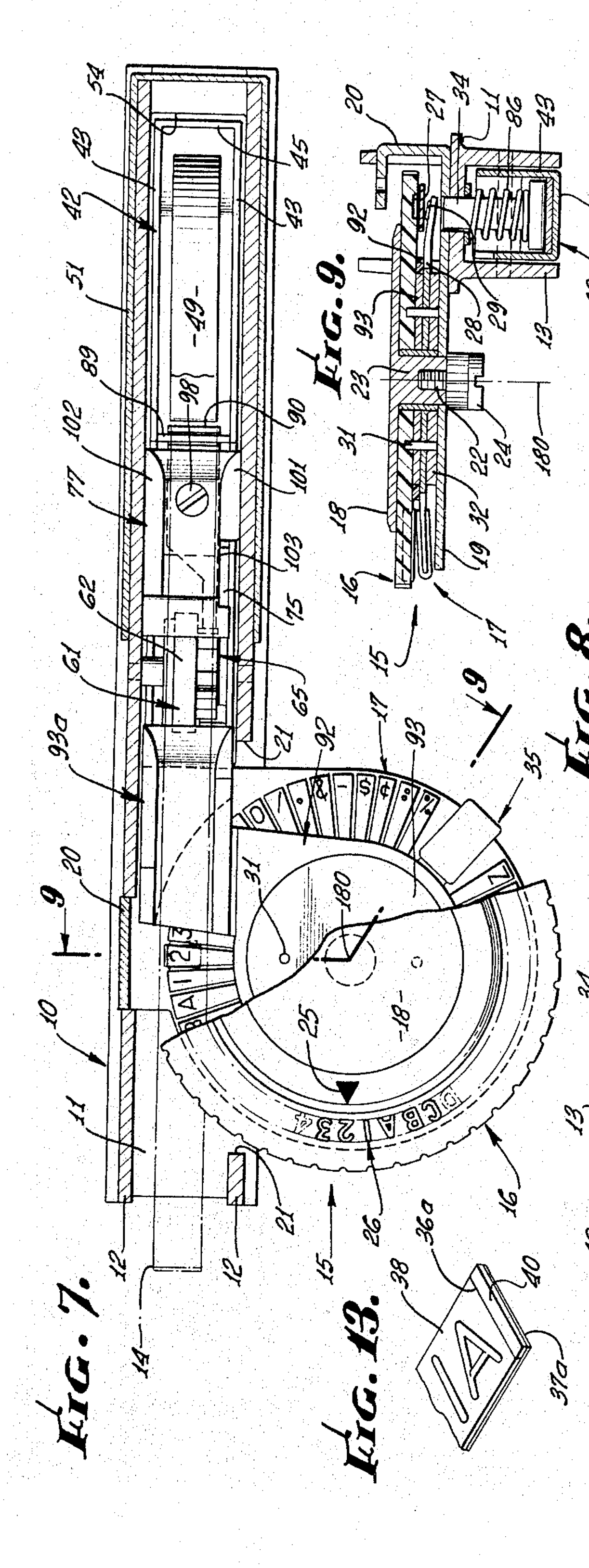
FIG. 7 is a section taken on line 7—7 of FIG. 4.
FIG. 9 is a section taken on line 9—9 of FIG. 7.
FIG. 13 is a perspective showing of the tape in severed and slit condition.
Figure 8:
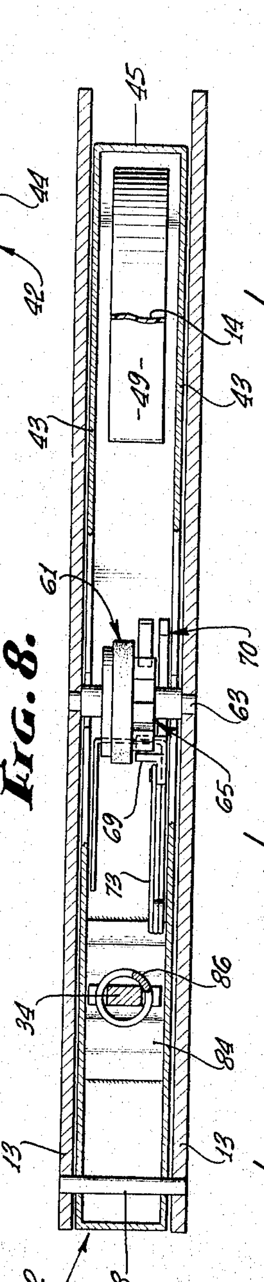
FIG. 8 is a section taken on line 8—8 of FIG. 4.

The body structure as previously mentioned also includes non-rotary plates 18 and 19 spaced apart in the direction of the axis 180 in such relation that the rotor structure 15 is confined between the plates. In this regard, the lower plate 19 may be made integral with at least one of the body flanges 12 as by attachment of the turned portion 20 of the plate to that flange, and by suitable attachment of the plate 19 to the base or table 11. The opposite flange 12 is interrupted at 21 as seen in FIG. 7 and also in FIG. 1 to pass the plate 19 horizontally. Further, the upper plate 18 is suitably attached to the lower plate 19 as by the fastener 22 threaded into the stem 23 of the upper plate, and having a head 24 bearing against the underside of the lower plate.

The upper plate 18 has a fixed maker 25 at the edge thereof. The rotor plate 16 projects peripherally and radially beyond the circumference of the upper circular plate 18, thereby to rotate indicia 26 thereon past the marker 25. Accordingly, the indicia 26 are selectively registrable with the marker 25 on the upper plate thereby to indicate the tape embossing position of selected die means as will be described. In this regard, the upper rotor typically has circularly spaced die elements at the lower face thereof, as for example recesses 27 as seen in FIG. 9. The lower rotor has spring fingers 28 projecting generally radially and beneath the recesses; the spring fingers also having die elements formed thereon to cooperate with the upper rotor die elements when the fingers are deflected upwardly to produce embossments on, or cutting of, tape received between the upper rotor and the spring fingers. Thus, for example the died elements 29 on the finger extensions 30 may project upwardly and be formed with the same configuration as the recesses 27 to produce number and letter embossments on the tape. Note further that the upper and lower rotors 16 and 17 are interconnected as by the projections 31 extending from the rotor part 32 upwardly through the rotors 16 and 17.

Figures 10, 11, 12:
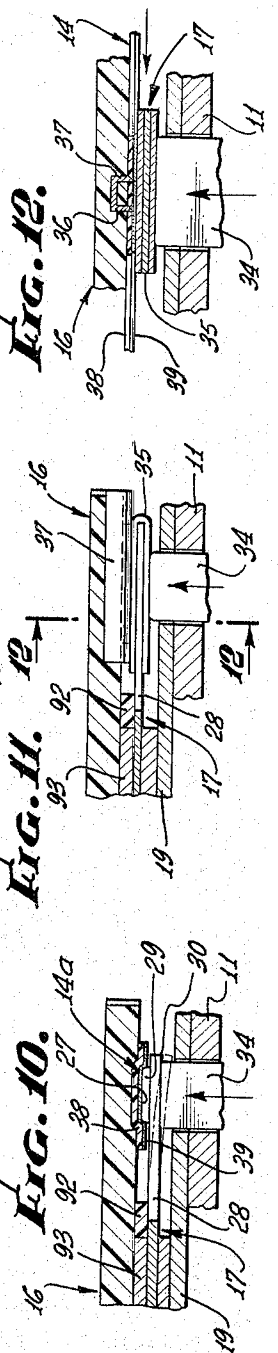
FIG. 10 is a fragmentary section enlarged to show tape embossment.
FIG. 11 is a fragmentary section enlarged to show tape severing and slitting.
FIG. 12 is a section taken on line 12—12 of FIG. 11.

FIG. 10 illustrates the upper deflection of a finger 28 as produced by a plunger 34 projecting upwardly through the elements 11 and 19 previously described. The tape is shown deformed at 14*a* as by the die part 29 urged toward the recess 27 in the die element on the upper rotor 16.

FIGS. 11 and 12 illustrate severing and slitting of the tape to produce the tape terminal as typically illustrated in FIG. 13. Thus, the plunger 34 is urged upwardly to elevate a patten 35 on a finger 28, thereby lifting the tape 14 against cutters 36 and 37. Cutter 37 carried by the upper rotor 16 projects downwardly sufficiently to sever the tape as better seen in FIG. 12. Cutter 36 which is spaced slightly from cutter 37 projects downwardly sufficiently to slit the upper layer 38 of the tape, but not to slit the lower backer 39 of the tape. Note in this regard the severed and slit locations 36*a* and 37*a* in FIG. 13. Accordingly, the backer may be peeled away from the embossed or crease whitened layer 38 as by gripping the tab 40 which may be bent and pulled downwardly with the backer relative to the layer 38.

The invention also contemplates the provision of an actuator carried by the body 10 for movement relative thereto in response to variable hand gripping of the actuator, the latter typically being pivoted and forming a hollow magazine for receiving a roll of tape to feed along the tape advancement channel. As an example, the actuator 42 seen in FIGS. 4 and 5 and also in FIG. 9 is channel-shaped and has side plates 43 and a base 44 interconnecting the side plates. Also, the channel-shaped actuator has a rear plate 45 as illustrated, and a magazine is thereby formed in the general area 46 at the rearward portion of the tool and which is adapted to be hand grasped by the user's fingers in the general area 47. The illustrated actuator lever is also pivoted at 48 to the body structure and at the forward end of the tool whereby the actuator lever is actuable to downward position as seen in FIG. 4 and up position as seen in FIG. 5. A roll of tape is indicated at 49 and within the magazine. Loading of the roll into the magazine is enabled by removal of a cover 50 releasably attached to the body frame to conceal the hollow magazine. In this regard, the cover is suitably channel-shaped and has side flanges 51 seen in FIG. 2 with inwardly turned portions at the lower extents of the flanges for reception within the slots 52 formed by the body flanges 12. Accordingly, the cover 50 may be withdrawn rearwardly in the direction of arrow 53 in FIG. 2 thereby to expose the magazine 46 which opens upwardly through an opening 54 in the body base 11. Therefore, there is no need for a separately attachable tape magazine, which would otherwise add to the expense of the tool, and loading and feeding of the tape is accommodated in as simple or more simple manner than would be the case where a separate tape magazine utilized.

The invention furthermore contemplates the provision of means operable in response to actuator movement for causing selected die means to engage and emboss the tape, and for effecting advancement of the tape along the channel, such means including a first roller presented for independent rotation by the user's thumb or finger to controllably advance or retract the tape along the feed channel. In this regard, the drawings show a roller 56 which is presented and exposed at the top level of the tool so that the user's thumb 57 may engage it as indicated. The roller typically has a hard rubber surface 58 and in the embodiment shown is pivotally mounted at 59 between the body flanges 12, whereby the tape feeds directly beneath the roller at 60. A second roller 61 is carried by the body structure directly beneath the first roller in such manner that the tape is frictionally gripped or pinched between the two rollers. As in the case of roller 56, the second roller 61 may have a compressible rubber surface 62 whereby the tape may be frictionally gripped between the rollers, and it is also pivotally attached at 63 to the body flanges 13. In this regard, the base 11 is interrupted at 64 to allow the second roller to project upwardly through the base 11 and grip the tape.

The means for effecting advancement of the tape along the channel typically includes escapement drive comprising a peripherally toothed escapement wheel 65 connected to rotate the second roller 61 as by mounting on the pivot 63. The escapement drive may also be considered to include mechanism engageable with a wheel tooth such as is seen at 66 in FIG. 4 to rotate the wheel 65 in response to movement of the actuator away from the body structure, i.e. in the direction of the arrow 67 in FIG. 4. As opposed to this, the mechanism is adapted to escape and engage another wheel tooth in response to movement of the actuator toward the body structure, i.e. in the direction of the arrow 68 in FIG. 5. Such mechanism typically includes a pawl 69 on a lever 70 having rocking attachment as by pin 71 to the actuator side plates 43, so that the pawl travels bodily with the actuator relative to the escapement wheel in the direction of arrow 68. A suitable wire spring 73 mounted on the actuator at 74 urges the pawl to rock in one rotary direction (i.e. clockwise) toward continuous engagement with the escapement wheel. The lever may also include an arm 75 having cam engagement at 76 with the body structure (and specifically with the guide 77 integral with the body base 11), the cam engagement operating to urge the pawl in a direction of rocking out of engagement with the escapement wheel in response to movement of the actuator toward the body structure i.e. in the direction of arrow 68 in FIG. 5. In this regard, a detent 78 on a spring finger 78*a* snaps into the notch between successive teeth on the wheel 65 upon rotation of the wheel in a counterclockwise direction, thereby to cause the rollers to hold the tape in a given position as determined by operation of the actuator. On the other hand, the tape may be advanced or retracted by finger or thumb rotation of the upper roller 56 with the lower roller 61 held against rotation by the detent. During retraction of the tape in this manner, the tape winds itself on the roll 49 in the hollow magazine since the latter has very light sliding engagement with the magazine at the tangent points 80 and 81.

The previously mentioned means operable in response to actuator movement for causing selected die means to engage and emboss the tape may typically include the plunger 34 carried by the actuator and projecting upwardly toward the tape feed channel as seen in FIGS. 4 and 5. The lower terminal 83 of the plunger is suitably retained in position as by the undulating retainer 84 forming a recess for loosely confining the terminal 83. The upper terminal of the plunger is received through a guide opening 85 in the base 11 of the body so as to direct the plunger upward movement toward a selected embossment or cutting finger. A coil spring 86 bears against a washer 87 and urges a plate 88 on the plunger in a downward direction to hold the plunger in position, urging it in a direction away from the tape feed channel, and also urging the actuator in the direction of arrow 67 away from the body structure. In this regard, a cross-piece 89 between the side plates of the actuator engages a hook 90 carried by the body structure, as seen in FIG. 4 to limit downward movement of the actuator relatively away from the body. The upward movement of the actuator toward the body is limited by engagement of the plunger with the lower rotor structure as described in connection with FIGS. 10 through 12.

FIG. 6 illustrates a tape guide which, as illustrated in FIG. 9 and also in FIG. 7, is carried to project from between the rotors 16 and 17 toward the tape feed channel to protectively space the tape from the fingers 28, i.e. to prevent the tape from feeding under the fingers and also to guide the tape during its advancement into the embossing position between the rotors 16 and 17. The guide typically includes a ring 92 fitting around the disc portion 93 of the upper rotor 16, and a channel 93a attached to the ring at 94. The channel includes a tapering entrance 95 for the tape feed beneath the roller 56 toward that channel. The discharge end 96 of the channel feeds the tape directly between the rotor fingers and the upper rotor 16. The guide as illustrated in FIG. 6 may be made of plastic material and may easily be assembled in the configuration shown.

The guide 77 previously mentioned is suitably attached as by fastener 98 to the body base 11. It too may be made of suitable plastic material, and it is seen in FIG. 3 to have a tapered entrance 100 for receiving tape spooling off the roll 49. The guide is generally channel-shaped and has side flanges 101 and 102. Flange 101 is interrupted to provide a slot at 103 for receiving the finger 75 as better seen in FIG. 7. The discharge end of the guide 77 is doubled back at 105 and there is an opening 106 at the bend 107 to pass the tape directly between the two rollers 56 and 61 as better seen in FIG. 4. Accordingly, the tape is continuously controlled during its advancement in a very simple manner as afforded by the simple construction and mode of operation of the apparatus. The latter is constructed in such manner as to provide a minimum of parts which are easily assembled to provide the highly advantageous tool construction described above.

We claim:

1. In hand operable tape embossing apparatus, body structure defining an elongated and upwardly opening tape feed channel, rotor structure including die means carried by the body structure to project sidewardly into the upwardly opening extent of said channel to be rotatable relative thereto for bringing selected die means into tape embossing position, an actuator carried by said body for movement relative thereto in response to variable hand gripping of said apparatus, and means operable in response to actuator movement for causing selected die means to engage and emboss the tape and for effecting advancement of the tape along said channel, said last named means including a first friction surfaced roller presented in said channel directly over the tape feed path therein and carried by said body structure to be freely rotatable in opposite directions by the user's thumb or finger and so as to be directly exposed for contact thereby to controllably advance and retract the tape along said channel independently of said actuator movement, the tape feeding in the channel remaining visible therein proximate said rotor structure so that embossed characters are visible at least as soon as the tape passes the periphery of said rotor structure.

2. Apparatus as defined in claim 1, in which said body structure includes non-rotary plates spaced apart in the direction of an axis defined by rotation of said rotor structure and between which said rotor structure is confined, one of said plates and said rotor structure carrying selectively registrable indicia indicative of the tape embossing position of selected die means.

3. Apparatus as defined in claim 2, in which said one plate is centrally attached to the other of said plates, said other plate projecting sidewardly from the main extent of the body structure and being integral therewith.

4. Apparatus as defined in claim 3, in which said rotor structure includes an upper rotor having circularly spaced die elements at the lower face thereof, and a lower rotor having spring fingers projecting generally radially and beneath said elements, the spring fingers also having die elements thereon formed to cooperate with the upper rotor die elements when the fingers are deflected upwardly to produce embossments on tape received between the upper rotor and spring fingers.

5. Apparatus as defined in claim 4 including a tape guide carried to project from between said rotors toward said channel to protectively space the tape from the fingers and to guide tape advancement into embossing position between the rotors.

6. Apparatus as defined in claim 1, in which said actuator is pivoted and forms a hollow magazine for receiving a roll of tape to feed along the channel, said magazine variably projecting in the rear interior of said channel during said actuator movement.

7. Apparatus as defined in claim 6, in which said means for causing selected die means to engage and emboss tape includes a plunger carried by the actuator and projecting upwardly toward said channel and a spring urging the plunger in a direction away from the channel also urging the actuator away from the body structure.

8. Apparatus as defined in claim 6, in which the body structure includes frame members between which the actuator is movable, and an access cover releasably attached to the frame to conceal the hollow magazine.

9. Apparatus as defined in claim 1, in which said last named means includes a second roller and an escapement drive therefor, said first and second rollers carried by the body structure to pinch the tape there-between, said escapement drive including a peripherally toothed escapement wheel connected to rotate the second roller and other means engageable with a wheel tooth to rotate the wheel in tape advancing direction in response to movement of the actuator away from the body structure and to escape and engage another wheel tooth in response to movement of the actuator toward the body structure, said first roller remaining rotatable in opposite directions independently of said second roller.

10. Apparatus as defined in claim 9 in which said escapement wheel is carried by the body structure, and last named means includes a pawl having rocking attachment to the actuator so that the pawl travels bodily with the actuator relative to the escapement wheel, and a spring urging the pawl to rock in one rotary direction toward engagement with the escapement wheel.

11. Apparatus as defined in claim 10, in which said pawl includes an arm having cam engagement with said body structure to urge the pawl in a direction of rocking out of engagement with the escapement wheel in response to movement of the actuator toward the body structure.

12. Apparatus as defined in claim 6, in which said body structure includes a tape guide receiving tape from the magazine and guiding it toward tangential engagement with said first roller.

13. In a hand operable tape dispenser, an elongated body forming a tape feed channel opening upwardly lengthwise of said body, means carried by the body to advance the tape forwardly in the channel to an embossing station and to emboss the tape at said station, said means including embossing rotor structure and an actuator movable relative to said body, a cover removably carried by said body to extend over a tape supply zone, said means also including a roller carried to engage and to feed tape lengthwise in the channel, the roller upper portion being exposed directly forwardly of the top of said cover so as to be rotatable by the thumb of the user's hand grasping said cover and actuator, said roller being rotatable to advance and retract tape in the channel independently of said actuator movement, the tape feeding in the channel remaining visible therein proximate said rotor structure so that embossed characters are visible at least as soon as the tape passes the periphery of said rotor structure.

14. The dispenser of claim 13 wherein said actuator forms said tape supply zone into which a tape roll is receivable when said cover is removed to expose said zone.

15. The dispenser of claim 13 wherein said channel is defined by body flanges to which said cover is removably attached and between which said roller is pivotally mounted.

References Cited

UNITED STATES PATENTS

| | | | |
|---|---|---|---|
| 2,275,670 | 3/1942 | Zipf | 197—6.7 |
| 3,083,807 | 4/1963 | Travaglio | 197—6.7 |
| 3,129,800 | 4/1964 | Bogeaus | 197—6.7 |
| 3,155,215 | 11/1964 | Avery | 197—6.7 |
| 3,239,048 | 3/1966 | Bogeaus | 197—6.7 |
| 3,277,992 | 10/1966 | Bremer | 197—6.7 |
| 3,307,674 | 3/1967 | Massen et al. | 197—6.7 |

ROBERT E. PULFREY, *Primary Examiner.*

E. S. BURR, *Examiner.*